United States Patent

Yoshizawa et al.

[11] Patent Number: 5,567,537
[45] Date of Patent: Oct. 22, 1996

[54] MAGNETIC CORE ELEMENT FOR ANTENNA, THIN-FILM ANTENNA, AND CARD EQUIPPED WITH THIN-FILM ANTENNA

[75] Inventors: Yoshihito Yoshizawa, Fukaya; Shunsuke Arakawa, Saitama-ken, both of Japan

[73] Assignee: Hitachi Metals, Ltd., Tokyo, Japan

[21] Appl. No.: 419,690

[22] Filed: Apr. 11, 1995

[30] Foreign Application Priority Data

Apr. 11, 1994 [JP] Japan .................................. 6-072229

[51] Int. Cl.$^6$ ......................................................... B32B 9/00
[52] U.S. Cl. .......................... 428/692; 428/689; 428/379; 343/787; 343/788
[58] Field of Search ..................................... 343/787, 788, 343/781 CA; 428/692, 689, 379

[56] References Cited

U.S. PATENT DOCUMENTS 5,220,338   6/1993   Matsushita ............................. 343/787
5,220,339   6/1993   Matsushita ............................. 343/788

FOREIGN PATENT DOCUMENTS 5-267922   10/1993   Japan ............................... H01Q 7/08

Primary Examiner—Patrick Ryan
Assistant Examiner—Cathy K. Lam
Attorney, Agent, or Firm—Sughrue, Mion, Zinn, Macpeak & Seas

[57] ABSTRACT

A magnetic core element for use in a thin antenna. The magnetic core element has a thickness of 25 μm or less and is made of a particular amorphous alloy strip or a particular nano-crystalline alloy strip. A thin antenna having a laminated magnetic core made of the magnetic core elements is highly resistant to deformation and has a high Q-value.

13 Claims, 3 Drawing Sheets

MAGNETIC CORE ELEMENT FOR ANTENNA, THIN-FILM ANTENNA, AND CARD EQUIPPED WITH THIN-FILM ANTENNA

BACKGROUND OF THE INVENTION

The present invention relates to a magnetic core element suitable for use in a thin-film antenna and a thin-film antenna made of the magnetic core element. The present invention further relates to a card equipped with the thin-film antenna such as IC card type interface for transmitting signal to or receiving signal from computers, a seasonal traffic ticket used in automatic ticket inspecting system, etc.

Recently, PC cards which have functions of peripheral devices for personal computers such as external storage devices, modems, etc. have come to be used. For example, PC cards having IC card type interface meeting the standards of PCMCIA (Personal Computer Memory Card International) and. JEIDA (Japan Electronic Industry Development Association) have come to be employed in small terminal devices including notebook-type personal computers. The PC cards are classified into three types, type 1, type 2 and type 3, depending upon their sizes. The type 1 is the thinnest of the three types. Therefore, thinner elements have been required for producing such thin PC cards.

The PC card is connected to a personal computer, etc., mainly via a socket having electroconductive terminals. However, this connecting manner involves several drawbacks such as insufficient contact between terminals, insufficient protection against copying the informations stored in cards.

On the other hand, a connecting manner of an IC card interface and a computer by means of electromagnetic wave is free from insufficient contact and has advantage that remote transmission and/or remote receipt of signal may be possible.

The IC cards utilizing electromagnetic wave in transmitting and/or receiving signals may be applied to seasonal bus or railroad tickets, ski lift tickets, membership cards, identification (I.D.) cards, etc. By using such IC cards, the inspection or examination made by a person can be automated. For example, the IC card can be used in an automatic ticket examination system where an automatic ticket examining machine at a wicket or entrance receives from an IC card electromagnetic waves corresponding to the information recorded in the IC card, checks the information, and then, opens the gate when no problem is detected or closes the gate or alarms when a problem is detected. Such IC cards, like the PC cards, are required to be capable of being put into a pocket or wallet, for example, to be as thinner as credit cards. The IC cards may be further provided a message displaying function such as that of a paging receiver. In this case, the IC card may be receive-only.

Such thin IC cards which transmit and receive signals via electromagnetic waves should be provided with antenna which is thin and of high performance. The frequency range of the electromagnetic wave for the IC cards is limited within the range around 134 kHz by governmental regulations.

Conventionally, as the antenna for use in a card, those having ferrite cores have been employed. However, since the ferrite core is so brittle to easily cause cracks due to a slight deformation of a card, the card having the antenna of ferrite core is not suitable for carrying it in a trouser pocket, etc. To solve this problem, a card may be made resistant to deformation. However, production of a rigid or stiff card results in increased production cost and a large size of a card as well as an unpleasant feeling when carrying it in a trouser pocket, etc. due to its resistance to deformation or bending.

JP-A-5-267922 discloses an automobile antenna as an example of antennas having a core comprising a laminate of amorphous alloy thin strips. An antenna of amorphous alloy core can gain a high inductance because of a high magnetic permeability of the amorphous alloy, and is superior to an antenna of ferrite core because amorphous alloys have a Q-value (quality factor) higher than ferrites in the frequency range of 10–20 kHz. The Q-value herein used is represented by $Q=\omega L/R$ wherein $\omega=2\pi f$, L is inductance, and R is resistance including a coil loss.

JP-A-5-267922 teaches that the antenna of amorphous core disclosed therein is produced through heat-treatment at 390°–420° C. for 0.5–2 hours and that the thickness of antenna is preferred to be about 15–35 μm. However, the antenna made from the amorphous core subjected to such heat-treatment as described above cannot gain a sufficient Q-value in a higher frequency range, i.e., a frequency range around 134 kHz at which IC cards is used.

OBJECT AND SUMMARY OF THE INVENTION

Accordingly, an object of the present invention is to provide a magnetic core element capable of providing a thin and deformation-resistant antenna with a sufficient antenna performance at a higher frequency range, in particular, at 100 kHz or higher.

Another object of the present invention is to provide an antenna with a high Q-value having the above magnetic core element.

A further object of the present invention is to provide a thin IC card having the above thin antenna.

As a result of intense investigation, the inventors have found that a magnetic core element made of a particular amorphous alloy or a particular nano-crystalline alloy shows excellent characteristics required for a thin antenna. The present invention has been accomplished based on this finding.

Thus, in a first aspect of the present invention, there is provided a magnetic core element made of an amorphous alloy strip of a thickness of 25 μm or less having a chemical composition represented by:

$$(Co_{1-a}Fe_a)_{100-b-c-d-e}T_bSi_cB_dY_e \qquad (1)$$

wherein T is at least one element selected from the group consisting of Mn, Ni, Ti, Zr, Hf, Cr, Mo, Nb, W, Ta, Cu, Ru, Rh, Pd, Os, Ir, Pt, Re and Sn; Y is at least one element selected from the group consisting of C, Ge, Ga, P and Al; a is a numerical value satisfying $0 \leq a \leq 0.1$; and b, c, d and e are atomic percentages each satisfying $0 \leq b \leq 15$, $0 \leq c \leq 20$, $5 \leq d \leq 25$, $0 \leq e \leq 20$ and $15 \leq c+d \leq 30$.

In a second aspect of the present invention, there is provided a magnetic core element made of an nano-crystalline alloy strip of a thickness of 25 μm or less having a chemical composition represented by:

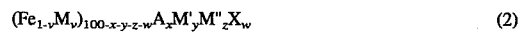
$$(Fe_{1-v}M_v)_{100-x-y-z-w}A_xM'_yM''_zX_w \qquad (2)$$

wherein M is Co, Ni or a combination thereof; A is Cu, Au or a combination thereof; M' is at least one element selected from the group consisting of Ti, V, Zr, Nb, Mo, Hf, Ta and W; M" is at least one element selected from the group consisting of Cr, Mn, Al, Sn, Zn, Ag, In, platinum group elements, Mg, Ca, Sr, Y, rare earth elements, N, O and S; X is at least one element selected from the group consisting of B, Si, C, Ge, Ga and P; v is a numerical value satisfying $0 \leq v \leq 0.5$; and x, y, z and w are atomic percentages each satisfying $0 \leq x \leq 10$, $0.1 \leq y \leq 20$, $0 \leq z \leq 20$ and $2 \leq w \leq 30$, at least 50% of the alloy structure comprising crystal grains of an average grain size of 100 nm or less.

In a third aspect of the present invention, there is provided a thin antenna comprising a laminated core of the magnetic core elements as defined above and at least one coil wound around the laminated core.

In a fourth aspect of the present invention, there is provided a card provided with the thin antenna as defined above and a transmitting circuit and/or a receiving circuit.

DETAILED DESCRIPTION OF THE PREFERRED EMBODIMENTS

Figure 1:
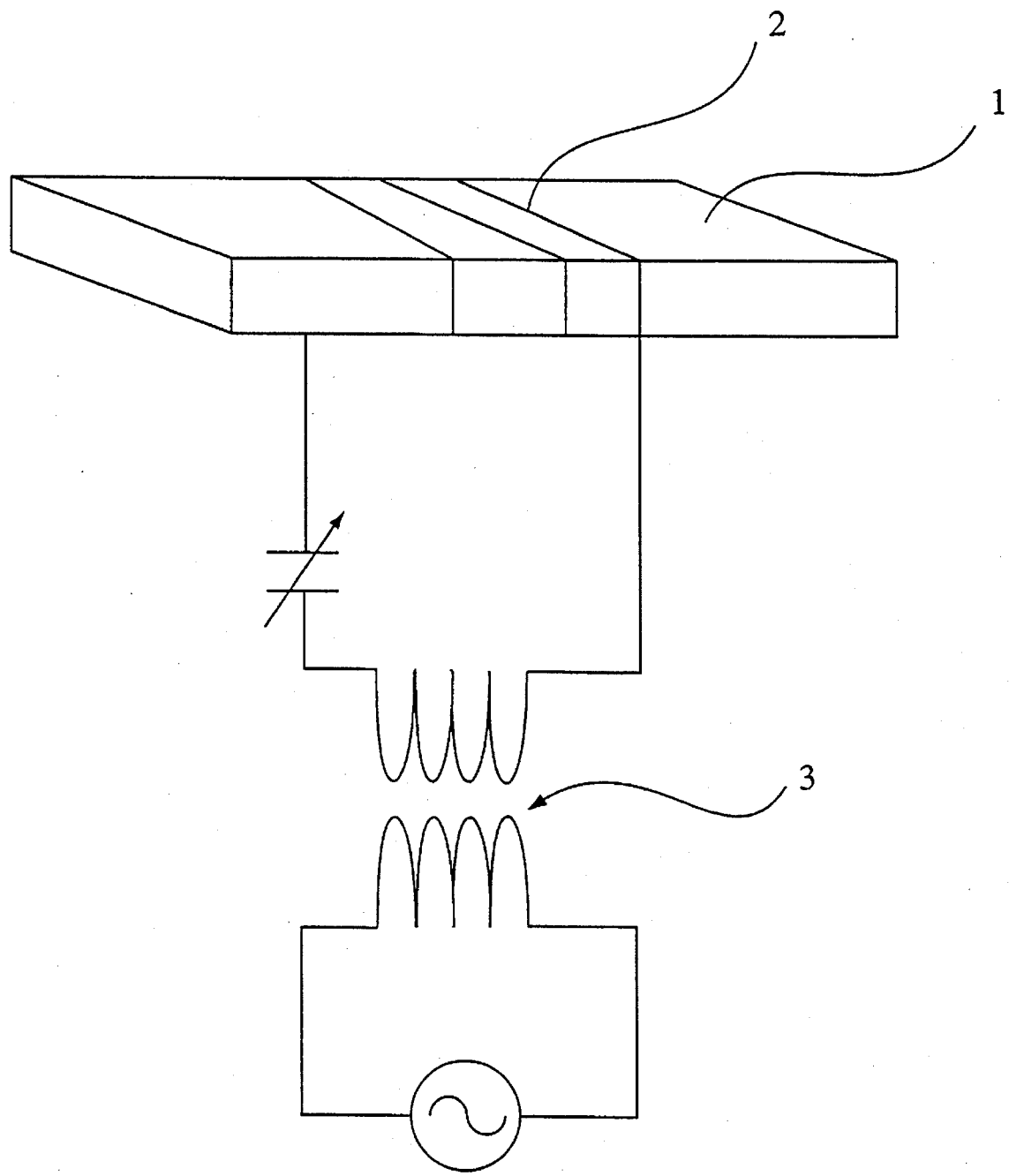
FIG. 1 is a schematic illustration showing the construction of the antenna according to the present invention.

The present invention will be described in detail below.

[A]Magnetic Core Element

The magnetic core element of the present invention is made of an amorphous alloy strip or a nano-crystalline alloy strip.

The amorphous alloy has a chemical composition represented by the formula:

(1)

In the formula (1), T is at least one element selected from the group consisting of Mn, Ni, Ti, Zr, Hf, Cr, Mo, Nb, W, Ta, Cu, Ru, Rh, Pd, Os, Ir, Pt, Re and Sn. These elements have effects of increasing the Q-value and improving the corrosion resistance of the alloy. Since the Q-value begins to decrease when the content of T (b) exceeds 15 atomic %, b is preferred to satisfy $0 \leq b \leq 15$, more preferably $0.5 \leq b \leq 10$ in terms of atomic %.

Y is at least one element selected from the group consisting of C, Ge, Ga, P and Al. Preferred Y is at least one element selected from the group consisting of Ge, Ga and P. These elements support the formation of amorphous state. The content of Y (e) exceeding 20 atomic % results in a significant decrease in magnetic flux density. Therefore the content (e) is preferably $0 \leq e \leq 20$, more preferably $0 \leq e \leq 10$ in terms of atomic %.

The numerical value, a, representing the composition ratio of Fe is preferably $0 \leq a \leq 0.1$, more preferably $0.01 \leq a \leq 0.07$. When the value of a exceeds 0.1, the magnetostriction is increased to cause decreasing in the Q-value due to the deformation of the alloy strip, adhesion of the alloy strips with a resin, etc.

The Si (silicon) content (c), the B (boron) content (d) and the sum of these contents (c+d) are $0 \leq c \leq 20$, preferably $10 \leq c \leq 20$, $5 \leq d \leq 25$, preferably $5 \leq d \leq 10$ and $15 \leq c+d \leq 30$ each in terms of atomic %, respectively. When all the Si content, B content and the sum of these contents are within the above ranges, a sufficient amount of oxide layer ($SiO_2$ layer) of high electric resistance is likely to be formed on the alloy surface to make the amorphous alloy strip highly insulating. By the formation of such oxide layer, a relatively high Q-value can be attained without carrying out any additional insulating treatment. On the other hand, when any of the Si content, B content and the sum of these contents is outside the above ranges, the Q-value at around 134 kHz is significantly decreased.

The other material for the magnetic core element is a nano-crystalline alloy having a chemical composition represented by the formula:

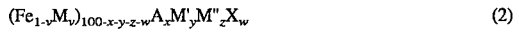
(2)

In the formula (2), M is Co, Ni or a combination thereof. The composition ratio of M (v) is $0 \leq v \leq 0.5$, preferably $0 \leq v \leq 0.1$ in terms of atomic %.

A is Cu, Au or a combination thereof. These elements have a function to make the grain structure more uniform and finer. The content of A (x) is $0 \leq x \leq 10$, more preferably $0.1 \leq x \leq 3$ in terms of atomic %.

M' is at least one element selected from the group consisting of Ti, V, Zr, Nb, Mo, Hf, Ta and W. Preferred M' is at least one element selected from the group consisting of Zr, Nb, Mo, Hf, Ta and W. These elements make the grain structure finer. The content of M' (y) is $0.1 \leq y \leq 20$, more preferably $1 \leq y \leq 10$ in terms of atomic %.

M" is at least one element selected from the group consisting of Cr, Mn, Al, Sn, Zn, Ag, In, platinum group elements, Mg, Ca, Sr, Y, rare earth elements, N, O and S. Preferred M" is at least one element selected from the group consisting of Cr, Mn, Al and Sn. These elements improve corrosion resistance and increase the Q-value of the resulting alloy. The content of M" (z) is $0 \leq z \leq 20$, preferably $0 \leq z \leq 10$ in terms of atomic %.

X is at least one element selected from the group consisting of B, Si, C, Ge, Ga and P. Preferred X is at least one element selected from the group consisting of B, Si, Ge, Ga and P. These elements have functions to make the formation of amorphous state easy, make the grain structure more uniform and finer, and increase the specific resistance to improve the Q-value. The content of X (w) is $2 \leq w \leq 30$, preferably $10 \leq w \leq 25$ in terms of atomic %.

The average grain size of the nano-crystalline alloy is 100 nm or less, and particularly preferable average grain size is 2–30 nm in view of the intended use of the present invention. At least 50% by area ratio of the alloy structure of the nano-crystalline alloy is preferred to be occupied by such grains.

The Curie temperature of the nano-crystalline alloy is preferably 500° C. or more, which is much higher than the Curie temperature of ferrite (about 200° C.) and representative Co-based amorphous alloys (400° C. or less). Further, as compared with known crystalline alloys, the nano-crystalline alloy of the present invention has a high thermostability because of its low temperature dependency of the magnetic permeability. Specifically, in the nano-crystalline alloy of the present invention, the rate of change in the magnetic permeability ($\Delta \mu$) represented by the formula:

$$\Delta \mu = (\mu_T - \mu_{20°\,C.})/\mu_{20°\,C.} \times 100$$

wherein $\mu_T$ and $\mu_{20°\,C.}$ are the magnetic permeability at T° C. and 20° C., respectively, is 20% or less in the range of −50 to 150° C.

The thickness of the magnetic core element is 25 μm or less. A magnetic core element having a thickness exceeding 25 μm is not suitable for practical use because the significantly decreased Q-value deteriorates the sensitivity of the antenna and prevents oscillation of the antenna. A magnetic core element having a thickness less than 15 μm is particularly preferred because a still higher Q-value and improved frequency characteristics can be attained.

The magnetic core element of the amorphous alloy strip is produced, for example, according to the following method.

A melt of the above composition is rapidly quenched by known liquid quenching methods such as a single roll method, a double roll method, etc. to form amorphous alloy ribbons. The quench method is carried out in vacuum or the air or in an inert gas atmosphere such as hydrogen, nitrogen, argon, etc.

The magnetic core element of the nano-crystalline alloy strip is produced, for example, according to the following method.

An amorphous ribbon produced by the above method is subjected to heat treatment by heating the amorphous alloy ribbon worked to have the desired shape in vacuum or in an inert gas atmosphere such as hydrogen, nitrogen, argon, etc. The temperature and time of the heat treatment varies depending upon the composition of the amorphous alloy ribbon and the shape and size of a magnetic core made from the amorphous alloy ribbon, etc. However, in general, it is heated at a temperature higher than its crystallization temperature.

The magnetic core element made of the amorphous alloy strip or nano-crystalline alloy strip may be provided with induced magnetic anisotropy in the width direction or in the thickness direction in order to further improve the Q-value at a frequency range around 134 kHz. Induced magnetic anisotropy may be provided by any one of methods of heat-treating an alloy strip at a temperature lower than the Curie temperature, for example, 5 minutes to 48 hours at 80°–600° C. (80°–450° C. for the amorphous alloy strip and 300°–600° C. for nano-crystalline alloy strip), heat-treating an alloy strip under stress (for 5 minutes to 48 hours at 80°–600° C.), and partially crystallizing the alloy surface (for 5 minutes to 48 hours at 400°–550° C.). The above treatments are conducted while applying a magnetic field of 80 A•m$^{-1}$ to 2000 kA•m$^{-1}$ in the width direction or in the thickness direction. Heat treatment in a magnetic field at a relatively low temperature lower than either temperature of 300° C. and the Curie temperature is preferred because the heat-treated alloy is less brittle and other characteristics may be improved.

[B]Antenna

The thin antenna of the present invention comprises a laminated magnetic core of the amorphous alloy strips and at least one coil wound around the laminated magnetic core. The amorphous alloy strips have a chemical composition represented by the formula (1) and have a thickness of 25 μm or less. The thickness of the laminated magnetic core is 3 mm or less, preferably 1 mm or less. The Q-value at 134 kHz of the antenna is 25 or more, preferably 35 or more, and more preferably 40 or more.

The other type of thin antenna of the present invention comprises a laminated magnetic core of the nano-crystalline alloy strips and at least one coil wound around the laminated magnetic core. The nano-crystalline alloy strips have a chemical composition represented by the formula (2) and have a thickness of 25 μm or less. The thickness of the laminated magnetic core is 3 mm or less, preferably 1 mm or less. The Q-value at 134 kHz of the antenna is 25 or more, preferably 35 or more, and more preferably 40 or more.

In both types of antenna, the magnetic core is constructed by a laminate of several layers of the amorphous alloy strips or the nano-crystalline alloy strips. Each of the alloy strips in the laminate may be adhered and fixed by a resin including organic resins such as epoxy resins, silicone resins, inorganic varnish, etc. The thickness of the adhesive layer and the number of the alloy strips to be laminated may be selected so that the thickness of the resulting laminated magnetic core may be 3 mm or less in the case of the magnetic core of the amorphous alloy strips, or 3 mm or less in the case of the magnetic core of the nano-crystalline alloy strips. Although the resin may serve as an electric insulator between the alloy strips, the alloy strips may be electrically insulated each other by powder or film of $SiO_2$, MgO, $Al_2O_3$, etc. or an insulating tape. Further, the surface of the laminated magnetic core may be insulated by the resin.

When each of the alloy strips is electrically insulated, a laminated magnetic core may be produced by applying a resin or an adhesive tape on the lateral surface of a laminate of alloy strips. In addition, a laminated magnetic core may be produced only by winding a coil around a laminated alloy strips without using any adhesive or adhesive tape after electrically insulating the coil and the laminated alloy strips by a resin layer, insulating pager, or insulating tape.

Although depending on the laminating method, heat treatment may be conducted before and/or after the adhesion of the alloy strips, preferably applying a magnetic field in the width or thickness direction of the alloy strips because, as described above, a higher Q-value can be attained. The heat treatment before the adhesion of the alloy strips may be preferably conducted at 80°–600° C. for 5 minutes to 48 hours in a magnetic field of 80 A•m$^{-1}$ to 2000 kA•m$^{-1}$. The heat treatment after the adhesion of the alloy strips may be preferably conducted at 80°–200° C. for 5 minutes to 48 hours in a magnetic field of 80 A•m$^{-1}$ to 2000 kA•m$^{-1}$. When a thermosetting resin is used as the adhesive, the thermosetting treatment may be preferably conducted at 80°–200° C. for 5 minutes to 48 hours applying a magnetic field of 80 A•m$^{-1}$ to 2000 kA•m$^{-1}$ in order to attain a higher Q-value. When the thermosetting treatment is conducted without applying a magnetic field, it is preferred to conduct a heat treatment applying a magnetic field after the thermosetting treatment for the same reason as above.

The inductance of the antenna at 134 kHz is preferred to be 1 mH or more in view of the oscillating frequency.

The thin antenna of the present invention suffers from no damage after subjected to 5 mm deformation in the thickness direction of the antenna when the length thereof is 20 mm or more. The 5 mm deformation means that the distance, after deformation, between the center of the magnetic core surface and a line connecting both the ends of the magnetic core surface is 5 mm.

The thin antenna of the present invention will be described referring to the drawings. FIG. 1 is a schematic illustration showing the construction of the thin antenna of the present invention. The reference numeral 1 is a laminated magnetic core which comprises mainly a laminate of several strips of magnetic material having high magnetic permeability, i.e., the amorphous alloy represented by the formula (1) and nano-crystalline alloy represented by the formula (2).

Figure 2:
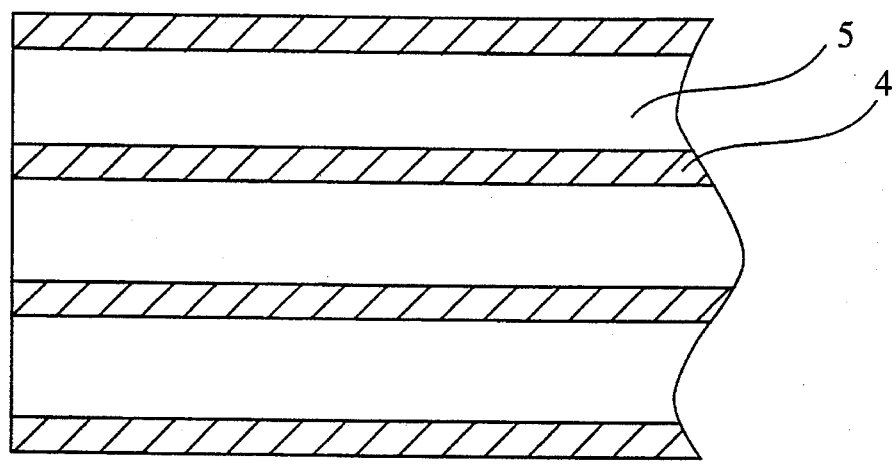
FIG. 2 is a cross-sectional view of the magnetic core of the antenna shown in FIG. 1.

The magnetic core 1 is formed by laminating several amorphous alloy strips and/or nano-crystalline alloy strips. These alloy strips are adhered each other, for example as shown in FIG. 2, by an impregnation method where a resin 4 such as epoxy resins is impregnated between the alloy strips 5 and the impregnated resin is subsequently thermoset. By this method, since fixing of the alloy strips and layer insulation are done at the same time, the rigidity of the resulting laminate and the efficiency of the antenna are improved simultaneously.

For example, the production of the laminated magnetic core by the impregnation method may be conducted as follows. A melt alloy having a chemical composition represented by the formula (1) or (2) is rapidly quenched to produce amorphous alloy strips. The amorphous alloy strips are cut into a predetermined shape and size, and then subjected to heat treatment. A resin is impregnated between the layers of a laminated alloy strip and thermoset to obtain a laminate of fixed alloy strips. The laminate thus obtained may be further subjected to heat treatment.

The resulting laminated magnetic core having a high rigidity and mechanical strength is then wound by a signal-transmitting coil 2 which is connected to an oscillator 3 to obtain the thin antenna of the present invention.

[C]Card

Figure 4:
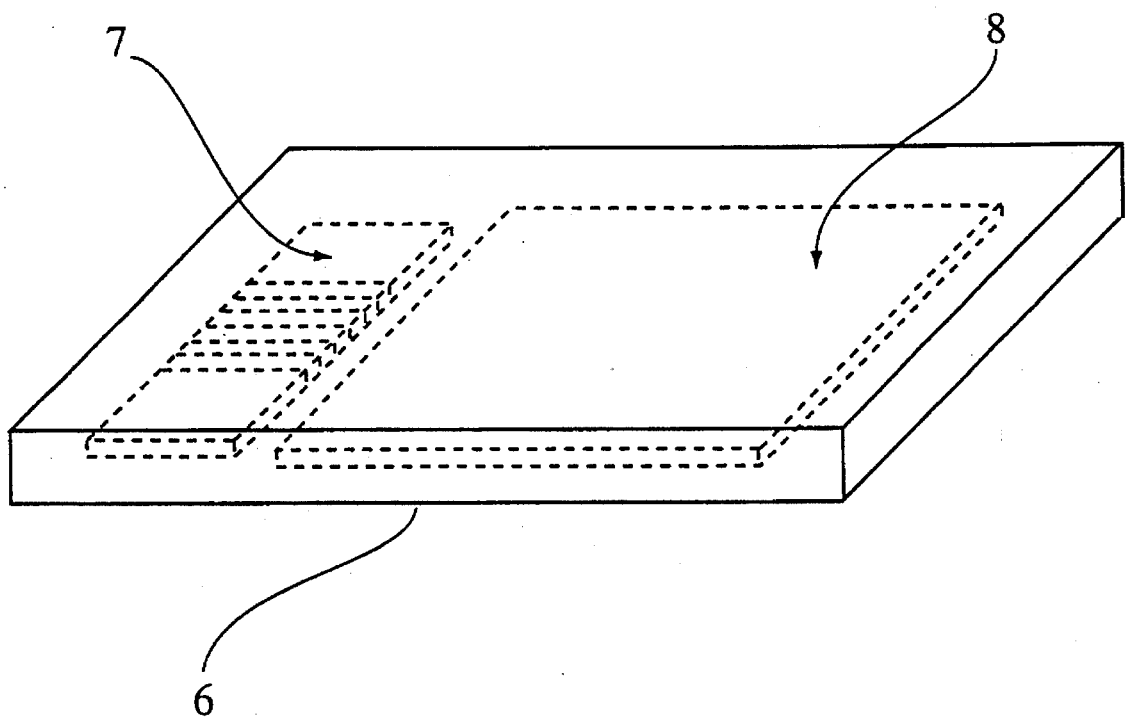
FIG. 4 is a schematic illustration showing an IC card according to the present invention.

The card (reference numeral 6 of FIG. 4) of the present invention has within it at least one of the thin antennas (reference numeral 7 of FIG. 4) as described above and a transmitting and/or receiving circuit (reference numeral 8 of FIG. 4). A typical card may has a dimension of 20–100 mm in width, 30–150 mm in length and 0.2–5 mm in thickness.

The card may be provided with a connector as is the case of known IC cards. In this type of card, the input and rewriting of the informations are made electrically via the connector and the usual transmission and/or receipt of the informations are conducted by electromagnetic waves.

The material for the card substrate is not specifically restricted and those for used in known credit cards, etc. may be used. The production method of the card is also not restricted and known methods may be applicable.

The present invention includes a card in which a magnetic core is formed by a thin-film forming method such as sputtering method, vapor deposition method, plating method, etc. In these method, a flexible substrate is preferred, and Co-Nb-Zr amorphous alloy and Co-Ta-Zr amorphous alloy may be also used.

The present invention will be described in more detail by way of Examples without intention of restricting the scope of the present invention which is defined by the claims attached hereto.

EXAMPLE 1 and
COMPARATIVE EXAMPLES 1–3

Amorphous alloy strips (50 mm length, 8 mm width and 8 μm thickness) having a chemical composition of $Co_{bal.}Fe_{1.5}Mn_4Mo_1Si_{15}B_{9.5}$ (atomic %) were prepared. The alloy strips were stacked and heat-treated at 200° C. for 4 hours while applying in the width direction a magnetic field of 280 kA·m$^{-1}$. After applying an epoxy resin on the surface, the alloy strips were laminated. The laminate thus obtained was then subjected to thermosetting treatment at 150° C. for 1 hour to prepare a laminated magnetic core (8 mm width, 50 mm length and 0.2 mm thickness) of amorphous alloy strips. The magnetic core was further subjected to heat treatment at 150° C. for 12 hours while applying in the width direction a magnetic field of 280 kA·m$^{-1}$. Then, a wire of 0.08 mm diameter was wound in 300 turns around the magnetic core thus heat-treated to obtain an antenna A. The inductance (L) and the Q-value at 134 kHz of the antenna A were measured. The results are shown in Table 1.

Separately, for comparison, the antenna B in which amorphous alloy strips were heat-treated at 400° C. for 1 hour without applying a magnetic field, the antenna C in which amorphous alloy strips were heat-treated in the same manner as in the antenna A while applying a magnetic field in the longitudinal direction, and the antenna D in which a ferrite magnetic core was used were prepared and subjected to the same measurement as above. The results are shown in Table 1.

The antennas A–D were further subjected to 5 mm deformation test to observe the occurrence of cracks. The results are also shown in Table 1.

TABLE 1

| No | Antenna | L (mH) | Q-value | Cracks |
|---|---|---|---|---|
| Example | | | | |
| 1 | Antenna A (amorphous) $(CO_{bal.}Fe_{1.5}Mn_4Mo_1Si_{15}B_{9.5})$ | 2.4 | 48 | None |
| Comparative Examples | | | | |
| 1 | Antenna B (amorphous) $(CO_{bal.}Fe_{1.5}Mn_4Mo_1Si_{15}B_{9.5})$ | 3.1 | 20 | None |
| 2 | Antenna C (amorphous) $(CO_{bal.}Fe_{1.5}Mn_4Mo_1Si_{15}B_{9.5})$ | 1.2 | 15 | None |
| 3 | Antenna D (Ferrite) | 2.0 | 52 | Observed |

As seen from Table 1, although the antenna D having a ferrite magnetic core was sufficient in the Q-value, it was likely to cause cracks. Therefore, the antenna D is not suitable for use in a card antenna which suffers from bending force and impact force. On the other hand, although no crack was observed, the antennas B and C were poor in the Q-value, this resulting in a low sensitivity of the antenna and no oscillation. Therefore, the antenna B and C are also not suitable for use as the thin antenna.

EXAMPLE 2

Amorphous alloy strips (50 mm length, 8 mm width and 6 μm thickness) having a chemical composition of $Fe_{73.5}Cu_1Nb_3Si_{14.5}B_{6.5}$ (atomic %) and an $SiO_2$ insulating layer of 0.5 μm thick on the surface thereof were prepared. The alloy strips were stacked, heat-treated at 550° C. for 1 hour while applying in the thickness direction a magnetic field of 600 kA·m$^{-1}$ and then cooled to room temperature at a cooling rate of 2° C./min. The alloy structure of the alloy strips thus treated was found to mainly comprise grains of fine bcc-phase having an average grain size of 10 nm. After applying an epoxy resin on the surface, the alloy strips were laminated. The laminate thus obtained was then subjected to thermosetting treatment at 150° C. for 1 hour to prepare a laminated magnetic core (8 mm width, 50 mm length and 0.2 mm thickness) of nano-crystalline alloy strips. Then, a wire of 0.08 mm diameter was wound in 300 turns around the magnetic core to obtain an antenna. The inductance (L) and the Q-value at 134 kHz of the antenna were measured. Further, the antenna was subjected to 5 mm deformation test to observe the occurrence of cracks. As the results, the antenna showed sufficient characteristics of 2.6 mH inductance and 44 of the Q-value. After 5 mm deformation test, no crack was observed.

EXAMPLES 3–11

Amorphous alloy strips (50 mm length and 8 mm width) of a chemical composition of $Co_{bal.}Fe_2Mn_4Mo_{0.3}Si_{15}B_{9.5}$ (atomic %) having various thicknesses shown in Table 2 were prepared. The alloy strips were stacked and heat-treated at 200° C. for 4 hours while applying in the width direction a magnetic field of 280 kA·m$^{-1}$ After applying an epoxy resin on the surface, the alloy strips were laminated. The laminate thus obtained was then subjected to thermosetting treatment at 150° C. for 1 hour while applying in the width direction a magnetic field of 100 kA·m$^{-1}$ to prepare a laminated magnetic core (8 mm width, 50 mm length and 0.2 mm thickness) of amorphous alloy strips. Then, a wire of 0.08 mm diameter was wound in 300 turns around the magnetic core to obtain each antenna. The Q-values at 134 kHz of the antennas were measured. The results are shown in Table 2.

TABLE 2

| Example No. | Thickness (μm) | Q-value |
| --- | --- | --- |
| 3 | 3 | 51 |
| 4 | 5 | 47 |
| 5 | 7 | 43 |
| 6 | 10 | 40 |
| 7 | 12 | 37 |
| 8 | 15 | 35 |
| 9 | 20 | 29 |
| 10 | 25 | 25 |
| 11 | 27 | 22 |

As seen from Table 2, it was found that the Q-value was increased as decreasing in the thickness of the alloy strip.

EXAMPLE 12 and COMPARATIVE EXAMPLE 4–5

Amorphous alloy strips (50 mm length, 8 mm width and 7 μm thickness) having a chemical composition of $Co_{bal.}Fe_2Mn_4Mo_{0.3}Si_{15}B_{9.5}$ (atomic %) were prepared. The alloy strips were stacked and heat-treated at 200° C. for 4 hours while applying in the width direction a magnetic field of 280 kA·m$^{-1}$. After applying an inorganic varnish on the surface, the alloy strips were laminated. The laminate thus obtained was then subjected to thermosetting treatment at 150° C. for 1 hour while applying in the width direction a magnetic field of 100 kA·m$^{-1}$ to prepare a laminated magnetic core (8 mm width, 50 mm length and 0.2 mm thickness) of amorphous alloy strips. Then, a wire of 0.08 mm diameter was wound in 300 turns around the magnetic core to obtain an antenna. The frequency dependency of the Q-value of the antenna was measured. For comparison, the same measurements were repeated on the antenna (Comparative Example 4) having a magnetic core comprising known amorphous alloy strips (($Co_{0.87}Fe_{0.13})_{bal}Si_9B_{15}Mo_1$) and subjected to heat treatment at 400° C. for 1 hour without applying a magnetic field, and an air-cored coil (Comparative Example 5). The results are shown in FIG. 3.

Figure 3:
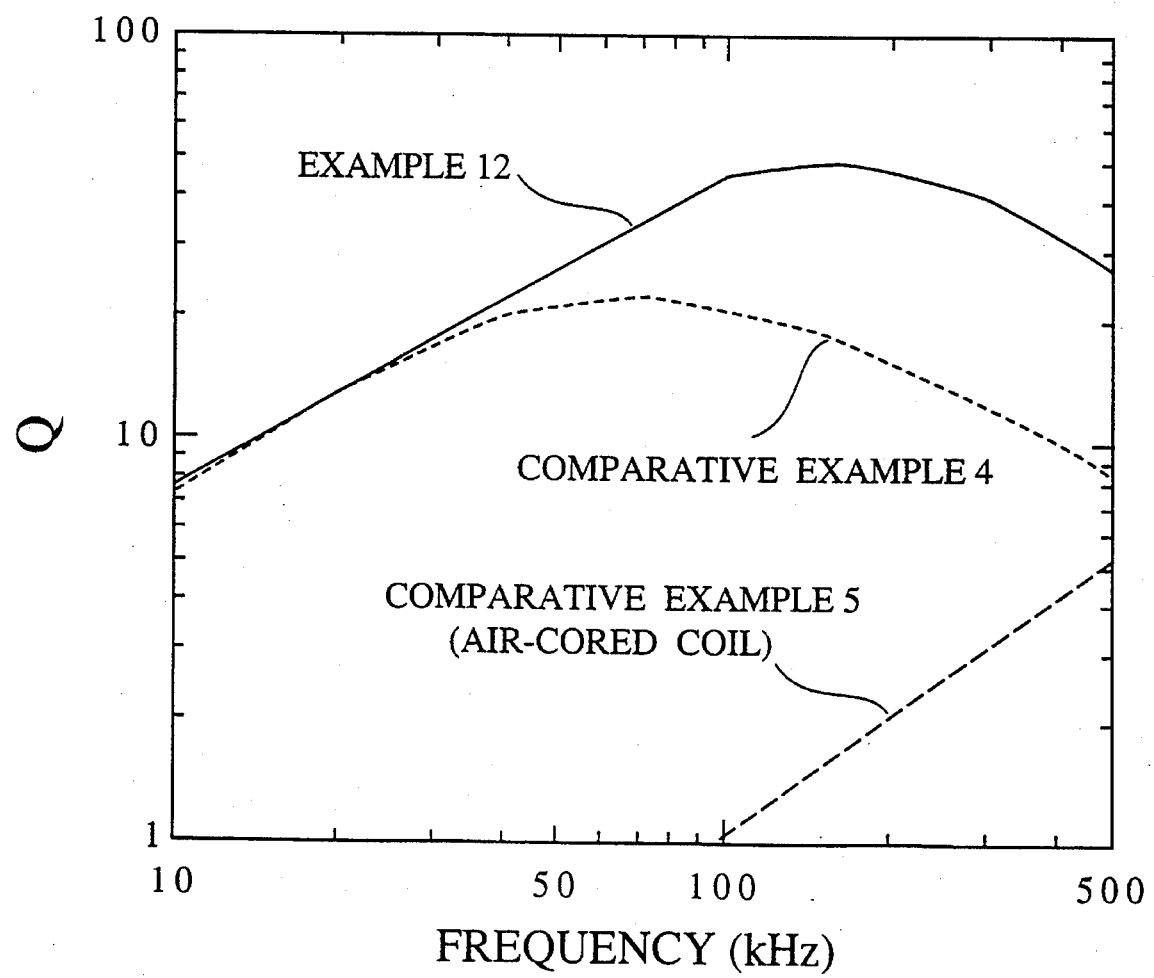
FIG. 3 is a graph showing frequency dependency of the Q-value.

As seen from FIG. 3, the antenna of the present invention showed Q-values higher than those of the antenna having a conventional amorphous magnetic core in the frequency range of 100 kHz or higher.

EXAMPLES 13–26 and COMPARATIVE EXAMPLES 6–9

Amorphous alloy strips (50 mm length, 8 mm width and 5 μm thickness) having respective chemical compositions shown in Table 3 and having an SiO$_2$ insulating layer of 0.5 μm thick on the surface thereof were prepared. The alloy strips were stacked, heat-treated at 150° C. for 24 hours in nitrogen atmosphere while applying in the width direction a magnetic field of 280 kA·m$^{-1}$. The alloy strips thus obtained were confirmed to be amorphous by X-ray diffraction. After applying an epoxy resin on the surface, the alloy strips were laminated, and the epoxy resin was cured at room temperature to prepare a laminated magnetic core (8 mm width, 50 mm length and 0.3 mm thickness) of amorphous alloy strips. The Q-values at 134 kHz of the magnetic cores were measured. The results are shown in Table 3.

TABLE 3

| No. | Chemical Composition (atomic %) | Q-value |
| --- | --- | --- |
| Examples | | |
| 13 | $(Co_{0.96}Fe_{0.04})_{bal.}Mn_{0.5}Nb_2Si_{13}B_9$ | 52 |
| 14 | $(Co_{0.94}Fe_{0.06})_{bal.}Ni_2Ta_2Si_{14}B_8$ | 47 |
| 15 | $(Co_{0.92}Fe_{0.08})_{bal.}Cu_1Zr_2Si_{14}B_8$ | 46 |
| 16 | $(Co_{0.92}Fe_{0.08})_{bal.}Cr_5Sn_{0.1}Si_{14}B_8Al_1$ | 45 |
| 17 | $(Co_{0.92}Fe_{0.08})_{bal.}W_3Ru_1Si_{14}B_8Rh_{0.5}$ | 46 |
| 18 | $(Co_{0.95}Fe_{0.05})_{bal.}Mo_3Ti_1Hf_1Si_{14}B_8Pd_{0.5}$ | 45 |
| 19 | $(Co_{0.91}Fe_{0.09})_{bal.}Mo_1Si_{13}B_7Re_{0.5}Pt_{0.5}C_1$ | 44 |
| 20 | $(Co_{0.95}Fe_{0.05})_{bal.}Mo_3Si_{14}B_8Ge_{0.5}$ | 47 |
| 21 | $(Co_{0.92}Fe_{0.08})_{bal.}Nb_3Si_5B_{10}P_{12}$ | 45 |
| 22 | $(Co_{0.92}Fe_{0.08})_{bal.}Mo_3Nb_1Si_{14}B_8Ga_{0.5}$ | 45 |
| 23 | $(Co_{0.96}Fe_{0.04})_{bal.}Mn_{0.5}Nb_2Si_{13}B_9Ge_2$ | 51 |
| 24 | $Co_{bal.}Mn_7Zr_7Si_5B_{10}$ | 42 |
| 25 | $(Co_{0.96}Fe_{0.04})_{bal.}Mo_2B_{22}$ | 43 |
| 26 | $(Co_{0.94}Fe_{0.06})_{bal.}Si_{19}B_7$ | 41 |
| Comparative Examples | | |
| 6 | $Co_{bal.}Fe_4Mo_2Si_{22}B_7$ | 23 |
| 7 | $Co_{bal.}Fe_4Ta_3Si_{19}B_{4.5}$ | 21 |
| 8 | $Co_{bal.}Fe_{12}Cr_2Si_{15}B_7$ | 17 |
| 9 | $Co_{bal.}Fe_4Mn_8Nb_8Si_{13}B_8$ | 16 |

As seen from Table 3, a high Q-value can be obtained when the chemical composition of the alloy is within the scope of the present invention, whereas alloys having a chemical composition outside the present invention are not suitable for use in a thin antenna.

EXAMPLES 27–42 AND COMPARATIVE EXAMPLES 10–13

Amorphous alloy strips (50 mm length, 8 mm width and 4 μm thickness) having respective chemical compositions shown in Table 4 and an SiO$_2$ insulating layer of 0.5 μm thick on the surface thereof were prepared. The alloy strips were stacked, heat-treated at 550° C. for 1 hour in argon atmosphere while applying in the width direction a magnetic field of 280 kA·m$^{-1}$ and then cooled to room temperature at a cooling rate of 1° C./min. The alloy structure of the alloy strips thus treated was found to mainly comprise grains of fine bcc-phase having an average grain size of 10 nm. After applying a room temperature curing epoxy resin on the surface, the alloy strips were laminated. The laminate thus obtained was allowed to stand at room temperature to cure the epoxy resin to prepare a laminated magnetic core (8 mm width, 50 mm length and 0.3 mm thickness) of nanocrystalline alloy strips. The Q-values at 134 kHz of the magnetic cores were measured. The results are shown in Table 4.

TABLE 4

| No. | Chemical Composition (atomic %) | Q-value |
|---|---|---|
| Examples | | |
| 27 | $Fe_{bal.}Cu_1Nb_2Si_{12}B_9$ | 50 |
| 28 | $Fe_{bal.}Cu_1Ni_2Ta_2Si_{14}B_8P_3$ | 46 |
| 29 | $Fe_{bal.}Cu_1Zr_7B_6$ | 40 |
| 30 | $Fe_{bal.}Cu_1W_{3.5}Si_{15.5}B_{6.5}$ | 43 |
| 31 | $Fe_{bal.}Cu_1Ta_{3.5}Si_{15.5}B_{6.5}$ | 47 |
| 32 | $Fe_{bal.}Cu_{0.5}Mo_{3.5}V_{0.5}Si_{15.5}B_{6.5}$ | 46 |
| 33 | $Fe_{bal.}Cu_1Nb_{3.5}Ti_1Si_{15.5}B_{6.5}$ | 44 |
| 34 | $Fe_{bal.}Cu_{1.5}Nb_3Hf_1Si_{16}B_5$ | 45 |
| 35 | $Fe_{bal.}Au_1Nb_3Mn_{0.5}Si_{16}B_5$ | 44 |
| 36 | $Fe_{bal.}Cu_1Nb_3Cr_{0.5}Si_{16}B_5$ | 44 |
| 37 | $Fe_{bal.}Cu_1Nb_3Si_{16}B_7Al_1Sn_{0.1}$ | 51 |
| 38 | $Fe_{bal.}Cu_1Nb_3Si_{16}B_7Al_1Zn_{0.01}$ | 45 |
| 39 | $Fe_{0.99}Co_{0.01})_{bal.}Cu_1Nb_3Si_{16}B_7Ag_{0.01}$ | 50 |
| 40 | $Fe_{0.995}Ni_{0.005})_{bal.}Cu_1Nb_3Si_{16}B_7Ge_2$ | 42 |
| 41 | $Fe_{bal.}Cu_1Mo_3Si_{16}B_6C_2$ | 40 |
| Comparative Examples | | |
| 10 | $Fe_{bal.}Cu_1Mo_3Si_{19}B_9C_3$ | 12 |
| 11 | $Fe_{bal.}Cu_1Si_{19}B_{2.5}$ | 2 |
| 12 | $(Fe_{0.3}Co_{0.7})_{bal.}Cu_1Nb_3Si_{15}B_7$ | 9 |
| 13 | $(Fe_{0.4}Ni_{0.6})_{bal.}Cu_1Mo_3Si_{14}B_8$ | 2 |

As seen from Table 4, a high Q-value can be obtained when the chemical composition of the alloy is within the scope of the present invention, whereas alloys having a chemical composition outside the present invention are not suitable for use in a thin antenna.

EXAMPLE 42

Amorphous alloy strips (50 mm length, 8 mm width and 5 μm thickness) having a chemical composition of $Co_{bal.}Fe_4Mo_1Si_{14}B_{9.5}$ (atomic %) were prepared. The alloy strips were stacked and heat-treated at 200° C. for 8 hours while applying in the width direction a magnetic field of 280 kA·m$^{-1}$. After applying an epoxy resin on the surface, the alloy strips were laminated. The laminate thus obtained was then subjected to curing treatment at room temperature for 24 hours to prepare a laminated magnetic core (8 mm width, 50 mm length and 0.2 mm thickness) of amorphous alloy strips. Then, a wire of 0.08 mm diameter was wound in 300 turns around the magnetic core to obtain an antenna. By using the resulting antenna, three IC cards (86 mm length and 54 mm width) having respective thickness of 3.3 mm, 1.7 mm and 0.8 mm were produced. The output levels of electromagnetic wave were measured before and after deflecting the card until the distance between the center of the card and the line connecting both the ends of the card reaches 1 mm. No change in the output levels was detected in any of the IC cards.

What is claimed is:

1. A magnetic core element in the form of an amorphous alloy strip of a thickness of 25 μm or less having a chemical composition representation by:

$$(Co_{1-a}Fe_a)_{100-b-c-d-e}T_bSi_cB_dY_e \quad (1)$$

where T is at least one element selected from the group consisting of Mn, Ni, Ti, Zr, Hf, Cr, Mo, Nb, W, Ta, Cu, Ru, Rh, Pd, Os, Ir, Pt, Re and Sn; Y is at least one element selected from the group consisting of C, Ge, Ga, P and Al; a is a numerical value satisfying $0 \leq a \leq 0.1$; and b, c, d and e are atomic percentages each satisfying $0 \leq b \leq 15$, $0 \leq c \leq 20$, $5 \leq d \leq 25$, $0 \leq e \leq 20$ and $15 \leq c+d \leq 30$, said magnetic core element being provided with an induced magnetic anisotropy in the width direction or in the thickness direction of said magnetic core.

2. A magnetic core element in the form of an nano-crystalline alloy strip of a thickness of 25 μm or less having a chemical composition represented by:

$$(Fe_{1-v}M_v)_{100-x-y-z-w}A_xM'_yM''_zX_w \quad (2)$$

wherein M is Co, Ni or a combination thereof; A is Cu, Au or a combination thereof; M' is at least one element selected from the group consisting of Ti, V, Zr, Nb, Mo, Hf, Ta and W; M" is at least one element selected from the group consisting of Cr, Mn, Al, Sn, Zn, Ag, In, platinum group elements, Mg, Ca, Sr, Y, rare earth elements, N, O and S; X is at least one element selected from the group consisting of B, Si, C, Ge, Ga and P; v is a numerical value satisfying $0 \leq v \leq 0.5$; and x, y, z and w are atomic percentages each satisfying $0 \leq x \leq 10$, $0.1 \leq y \leq 20$, $0 \leq z \leq 20$ and $2 \leq w \leq 30$, at least 50% of the alloy structure comprising crystal grains of an average grain size of 100 nm or less.

3. The magnetic core element according to claim 2, wherein said magnetic core element is provided with induced magnetic anisotropy in the width direction or in the thickness direction of said magnetic core element.

4. The magnetic core element according to claim 1, wherein the thickness of said magnetic core element is 15 μm or less.

5. The magnetic core element according to claim 2, wherein the thickness of said magnetic core element is 15 μm or less.

6. A thin antenna comprising a laminated magnetic core and at least one coil wound around said laminated magnetic core and having a Q-value of 25 or more at 134 kHz, said laminated magnetic core having a thickness of 3 mm or less and being composed of a plurality of magnetic core elements in the form of amorphous alloy strips of a thickness of 25 μm or less having a chemical composition represented by:

$$(Co_{1-a}Fe_a)_{100-b-c-d-e}T_bSi_cB_dY_c \quad (1)$$

wherein T is at least one element selected from the group consisting of Mn, Ni, Ti, Zr, Hf, Cr, Mo, Nb, W, Ta, Cu, Ru, Rh, Pd, Os, Ir, Pt, Re and Sn; Y is at least one element selected from the group consisting of C, Ge, Ga, P and Al; a is a numerical value satisfying $0 \leq a \leq 0.1$; and b, c, d and e are atomic percentages each satisfying $0 \leq b \leq 15$, $0 \leq c \leq 20$, $5 \leq d \leq 25$, $0 \leq e \leq 20$ and $15 \leq v+d \leq 30$, said magnetic core element being provided with an induced magnetic anisotropy in the width direction or in the thickness direction of said magnetic core.

7. A thin antenna comprising a laminated magnetic core and at least one coil wound around said laminated magnetic core and having a Q-value of 25 or more at 134 kHz, said laminated magnetic core having a thickness of 3 mm or less and being composed of a plurality of nano-crystalline alloy strips of a thickness of 25 μm or less having a chemical composition represented by:

$$(Fe_{1-v}M_v)_{100-x-y-z-w}A_xM'_yM''_zX_w \quad (2)$$

wherein M is Co, Ni or a combination thereof; A is Cu, Au or a combination thereof; M' is at least one element selected from the group consisting of Ti, V, Zr, Nb, Mo, Hf, Ta and W; M" is at least one element selected from the group consisting of Cr, Mn, Al, Sn, Zn, Ag, In, platinum group elements, Mg, Ca, Sr, Y, rare earth elements, N, O and S; X is at least one element selected from the group consisting of B, Si, C, Ge, Ga and P; v is a numerical value satisfying $0 \leq v \leq 0.5$; and x, y, z and w are atomic percentages each satisfying $0 \leq x \leq 10$, $0.1 \leq y \leq 20$, $0 \leq z \leq 20$ and $2 \leq w \leq 30$, at least 50% of the alloy structure comprising crystal grains of an average grain size of 100 nm or less.

8. The thin antenna according to claim 6 or 7, wherein the thickness of said laminated magnetic core is 1 mm or less.

9. The thin antenna according to claim 6 or 7, wherein the inductance at 134 kHz of said antenna is 1 mH or more.

10. The thin antenna according to claim 8, wherein the inductance at 134 kHz of said antenna is 1 mH or more.

11. The thin antenna according to claim 6 or 7, wherein said laminated magnetic core suffers from no cracks after deflecting said laminated magnetic core until the distance between the center portion on the surface of said laminated magnetic core and a line connecting both the ends of the surface of said laminated magnetic core reaches 5 mm when the length of said laminated magnetic core is 20 mm or more.

12. A card equipped therein with said thin antenna according to claim 6 or 7 and a transmitting circuit and/or receiving circuit.

13. The card according to claim 12, wherein said card after deflected until the distance between the center portion on the surface of said card and a line connecting both the ends of the surface of said card reaches 1 mm shows the same antenna efficiency as that before subjected to said deflection.

* * * * *